Oct. 25, 1955 L. A. MILLER 2,721,537
ANIMAL OPERATED AGITATOR TYPE HOPPER AND TROUGH
Filed June 29, 1953 2 Sheets-Sheet 1
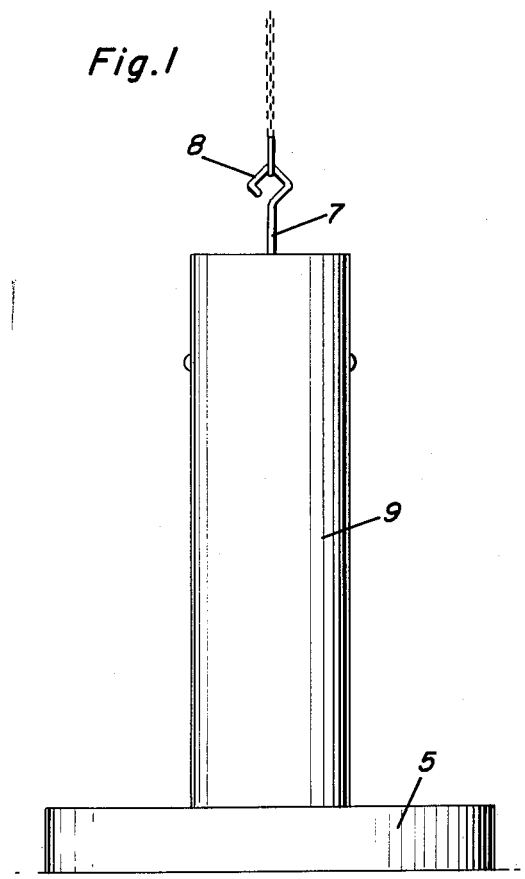
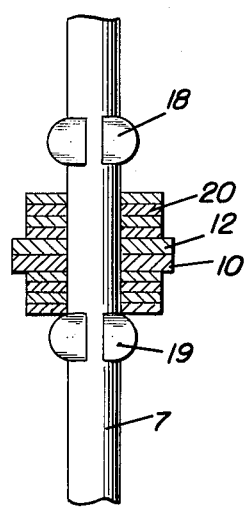
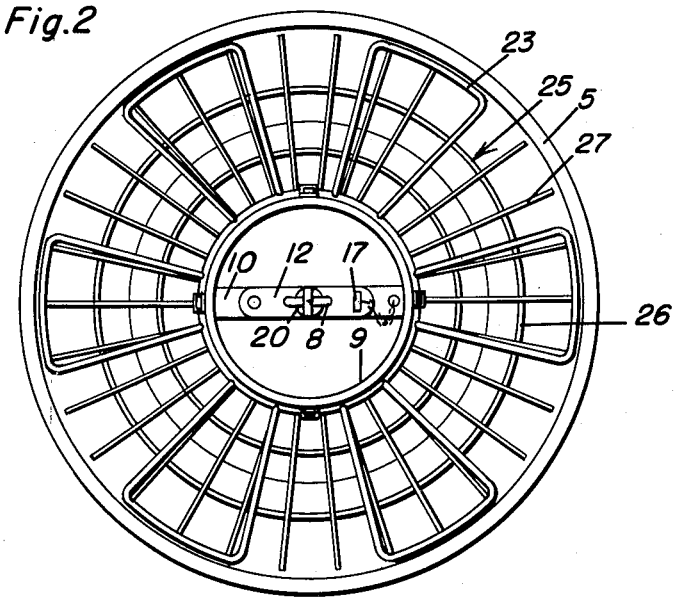
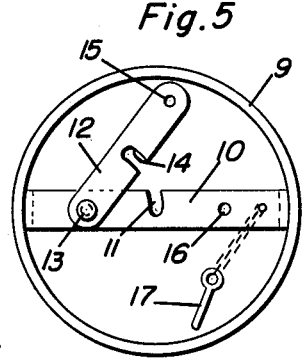
Levi A. Miller
INVENTOR.

Oct. 25, 1955  L. A. MILLER  2,721,537
ANIMAL OPERATED AGITATOR TYPE HOPPER AND TROUGH
Filed June 29, 1953  2 Sheets-Sheet 2
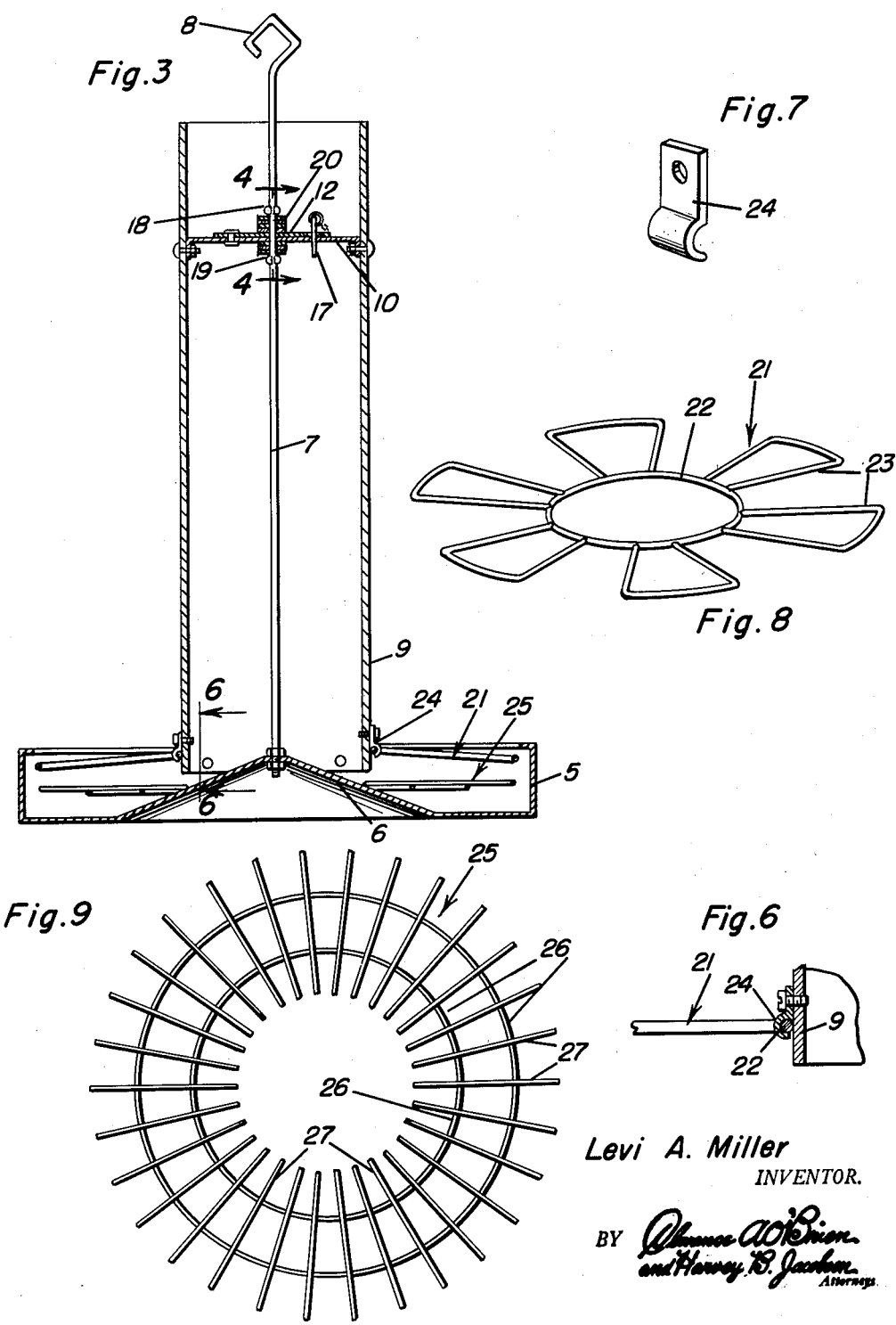
Levi A. Miller
INVENTOR.

United States Patent Office 2,721,537
Patented Oct. 25, 1955

2,721,537

ANIMAL OPERATED AGITATOR TYPE HOPPER AND TROUGH

Levi A. Miller, Shipshewana, Ind.

Application June 29, 1953, Serial No. 364,648

3 Claims. (Cl. 119—53)

The present invention relates to new and useful improvements in poultry feeders for use with either baby chicks or full grown chickens and other poultry.

An important object of the invention is to provide a suspension type feeder to be hung from the ceiling in a poultry house and having a circular feeding pan at the lower end of the feeder and under a vertically adjustable feed hopper.

Another object is to provide a poultry actuated agitator as well as a scratch guard in the feeding pan to maintain a regulated flow of feed to the pan and to prevent scattering the feed by the poultry.

A further object is to provide a device of this character of simple and practical construction, which is economical, efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view;

Figure 2 is an enlarged top plan view;

Figure 3 is a vertical sectional view on an enlarged scale;

Figure 4 is an enlarged fragmentary vertical sectional view taken on a line 4—4 of Figure 3;

Figure 5 is an enlarged top plan view of the hopper and showing the vertical adjusting catch for the hopper;

Figure 6 is an enlarged fragmentary vertical sectional view taken on a line 6—6 of Figure 3;

Figure 7 is an enlarged perspective view of one of the clips for securing the scratch guard to the hopper;

Figure 8 is an enlarged perspective view of the scratch guard; and,

Figure 9 is an enlarged plan view of the agitator.

Referring now to the drawings in detail, wherein for the purpose of illustration I have disclosed a preferred embodiment of my invention, the numeral 5 designates a circular feeding pan having a central stationary conical feed distributor 6 rising from the central portion of the bottom of the pan to distribute feed toward the sides of the pan. The pan is suspended in an elevated position by means of a rod 7 secured at its lower end to the apex of the distributor and having a hook 8 at its upper end for attaching to the ceiling of a poultry house (not shown).

A cylindrical hopper 9 is supported by rod 7 by means of a cross bar or spider 10 secured internally of the hopper and having a notch 11 in its central portion to receive rod 7. The rod is locked in the notch by a pivoted catch 12 having one end pivoted to the bar by a rivet or the like 13 and also having a notch 14 in its central portion alined with notch 11 to also receive the rod. The free end of catch 12 is formed with an opening 15 adapted for aligning with an opening 16 in bar 10 and in which a locking key or pin 17 is inserted to lock the catch in closed position.

Upper and lower bendable lugs 18 and 19 project outwardly from rod 7 in vertically spaced apart relation to each other and between which a plurality of washers 20 are positioned and adapted for placing a selected number of the washers either above or below the cross bar 10 and catch 12 to adjust the hopper vertically on the rod and to thus space the lower end of the hopper a desired distance above the distributor 6 to regulate the feeding of the contents of the hopper to the pan.

A wire scratch guard 21 of reticulated form is constructed to provide a central ring 22 and a plurality of substantially U-shaped arms 23 projecting radially therefrom and is secured in the upper portion of the pan 5 by clips 24 securing the ring 22 to the lower portion of hopper 9.

An agitator 25 is also mounted in the pan under the scratch guard 21 and is constructed to provide a plurality of concentric rings 26 to which a plurality of radially disposed rods or spokes 27 are welded or otherwise suitably secured. The inner ends of rods 27 rest on the sloping surface of distributor 6 at a point below the lower end of hopper 9 and the agitator is rotated on the distributor by the action of poultry feeding from the hopper when the bill of the poultry passes between the spokes of the agitator and the movement of the head of the poultry tends to turn the agitator.

In the operation of the device, the pan 5 is supported in a suspended position from the ceiling of a poultry house at a desired elevation according to the size of the poultry so that the heads of the poultry may reach into the pan to feed therefrom. The scratch guard 21 prevents the poultry standing in the feed in the pan.

The hopper 9 is adjusted vertically on rod 7 by shifting the position of the washers 20 above or below crossbar 10 and catch 12 to thus regulate the delivery of feed to the pan and the hopper is locked in its adjusted position by closing the catch against the rod and between the lugs 18 and 19 and a predetermined grouping of the washers.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A poultry feeder comprising a pan having a conical distributor at its central bottom portion, said conical distributor including an apex and a base portion, a hanger attached at its lower end to the apex of the conical distributor, a hopper supported on the upper portion of the hanger and having a lower delivery end supported in spaced relation above the distributor, a substantially horizontal stationary reticulated scratch guard projecting radially outwardly at the lower end of the hopper and overlying the pan, and a poultry actuated agitator loosely and rotatably mounted on the sloping surface of the conical distributor at a position on said surface substantially midway the apex and base portion thereof and under the guard, said scratch guard and said agitator including radially projecting rods and with the rods of the scratch guard spaced above the rods of the agitator, and said agitator further including at least one annular rod intersecting the radial rods adjacent the outer ends of the latter.

2. The construction of claim 1 wherein said scratch guard includes a wire ring, clamping means carried by the hopper and securing the ring in position surrounding the hopper adjacent the delivery end thereof, horizontal wire arms projecting radially from the ring, said agitator comprising a ring having a plurality of spokes fixed thereto, said spokes having their inner end portions resting on the sloping sides of the conical distributor and supported thereby in a horizontal position in spaced parallel relation to and under said arms, said arms of the scratch guard limiting agitating movement of the agitator by the heads of poultry when inserted between the arms and spokes.

3. In a poultry feeder, the combination of a feed pan having a conical distributor at the central bottom portion of the pan and a hopper supported by the pan for delivering feed onto the conical distributor, said conical distributor including an apex and a base portion, and a reticulated poultry actuated member loosely and rotatably supported on the sloping surface of the conical distributor, at a position on said surface substantially midway the apex and base portion thereof and spaced above the bottom of the pan, said reticulated member including a ring having a plurality of radially extending rods intersecting the ring at a point adjacent the outer ends of the rods and between which the bills of poultry are adapted for insertion to reach the feed, said ring restraining movement of the heads of the poultry in a radial direction in the pan to reduce scattering of the feed and said rods being engaged by the heads of the poultry when the latter are moved from side to side to turn the reticulated member in the pan for agitating and leveling the feed.

References Cited in the file of this patent

UNITED STATES PATENTS

| | | |
|---|---|---|
| 1,141,059 | Hershey | May 25, 1915 |
| 1,366,052 | Bettenga | Jan. 18, 1921 |
| 1,388,608 | Schow | Aug. 23, 1921 |
| 1,818,419 | Miller | Aug. 11, 1931 |
| 2,153,455 | Casper et al. | Apr. 4, 1939 |
| 2,277,420 | Stanfield | Mar. 24, 1942 |
| 2,377,202 | Bane | May 29, 1945 |
| 2,429,777 | Smith | Oct. 28, 1947 |
| 2,438,080 | Van Meeteren | Mar. 16, 1948 |
| 2,512,260 | Powell | June 20, 1950 |
| 2,522,634 | Pitteriger | Sept. 19, 1950 |
| 2,570,640 | Carmo | Oct. 9, 1951 |

FOREIGN PATENTS

| | | |
|---|---|---|
| 202,191 | Great Britain | Aug. 16, 1923 |